(12) United States Patent
Maeda et al.

(10) Patent No.: US 12,260,280 B2
(45) Date of Patent: Mar. 25, 2025

(54) RFID LABEL, RFID RECORDING MEDIUM, AND METHOD FOR MANUFACTURING RFID LABEL

(71) Applicant: SATO HOLDINGS KABUSHIKI KAISHA, Tokyo (JP)

(72) Inventors: Yoshimitsu Maeda, Tokyo (JP); Faiz Adi Ezarudin Bin Adib, Tokyo (JP)

(73) Assignee: SATO HOLDINGS KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/035,080

(22) PCT Filed: Nov. 29, 2021

(86) PCT No.: PCT/JP2021/043537
§ 371 (c)(1),
(2) Date: May 2, 2023

(87) PCT Pub. No.: WO2022/163112
PCT Pub. Date: Aug. 4, 2022

(65) Prior Publication Data
US 2024/0013024 A1   Jan. 11, 2024

(30) Foreign Application Priority Data

Jan. 29, 2021 (JP) ................. 2021-013411

(51) Int. Cl.
*G06K 19/077* (2006.01)
*G09F 3/02* (2006.01)

(52) U.S. Cl.
CPC ......... *G06K 19/07773* (2013.01); *G09F 3/02* (2013.01); *G09F 2003/023* (2013.01); *G09F 2003/0257* (2013.01)

(58) Field of Classification Search
CPC .......... G06K 19/07773; G06K 19/025; G06K 19/07786; G06K 19/07718; G06K 19/07722; G06K 19/07749; G06K 19/0776; G09F 3/02; G09F 2003/023; G09F 2003/0257; G09F 9/0291; G09F 3/10; G09F 3/0335
See application file for complete search history.

(56) References Cited

U.S. PATENT DOCUMENTS

2016/0290871 A1* 10/2016 Kozono ............ G01K 1/02
2020/0302261 A1   9/2020 Maeda

FOREIGN PATENT DOCUMENTS

| CN | 110964460 A | 4/2020 |
| CN | 111860735 A | 10/2020 |

(Continued)

OTHER PUBLICATIONS

Extended European Search Report issued in EP Appl. No. 21923117.2 on Jun. 10, 2024.

*Primary Examiner* — Matthew Mikels
(74) *Attorney, Agent, or Firm* — Foley & Lardner LLP (57) ABSTRACT

An embodiment of the present invention is an RFID label having a label substrate, an RFID antenna, an IC chip, and an adhesive layer that are stacked in this order. The label substrate is a thermal paper having a thermosensitive color developing layer on one surface. The RFID antenna is provided on the other surface of the label substrate. The IC chip is connected to the RFID antenna with an ultraviolet curable anisotropic conductive adhesive.

6 Claims, 5 Drawing Sheets

(56) References Cited

FOREIGN PATENT DOCUMENTS

| | | |
|---|---|---|
| JP | 2014-059694 A | 4/2014 |
| JP | 2020-181478 A | 11/2020 |
| WO | WO-2017/159222 A1 | 9/2017 |

\* cited by examiner

FIG.5
X-X CROSS SECTION

RFID LABEL, RFID RECORDING MEDIUM, AND METHOD FOR MANUFACTURING RFID LABEL

FIELD

The present invention relates to an RFID label, an RFID recording medium, and a method for manufacturing an RFID label.

BACKGROUND

In recent years, radio frequency identification (RFID) labels have been widely used as labels to be affixed to articles for the purpose of production, management, or distribution of the articles. RFID labels are incorporated with an RFID inlay in which an IC chip applicable to RFID and an antenna pattern having a predetermined shape are stacked on a base film. The IC chip is able to store various pieces of information related to an article.

Conventional RFID labels have an adhesive paper that includes a label substrate, an adhesive layer, and a separator stacked in this order, in which a PET film-based RFID inlay is placed between the adhesive layer and the separator. The label substrate uses a thermal transfer printing paper or film, or a thermal paper.

In conventional methods for manufacturing an RFID label, a label, which is composed of a label substrate, an adhesive layer, and a separator, and an inlay, are fabricated separately from each other and are then combined together. This method uses a lot of constituent materials and needs a large number of processing steps, which prevents mass production and cost reduction. Finished RFID labels, which are composed of many materials, are thick and stiff and thereby hardly adhere to curved surfaces, compared with general-purpose labels.

From this point of view, an RFID label having an antenna that is directly formed on a surface opposite to a printing surface of a label substrate, that is, an RFID label in which an inlay is omitted, has been developed (see published PCT international application WO 2017/159222). Due to the label substrate also functioning as a base film of an inlay, this structure is reduced in number of constituent materials and contributes to resource saving.

BRIEF SUMMARY

Technical Problem

Unfortunately, a thermal paper cannot be used as a label substrate of an RFID label in which an inlay is omitted. This is because a thermosetting anisotropic conductive adhesive is used in placing an IC chip on an antenna that is formed on a back surface of a label substrate. If a thermal paper is used as a label substrate, the thermal paper in the vicinity of the IC is discolored due to a heat setting operation of the adhesive.

In manufacturing RFID labels, the following method has been conventionally used. Specifically, a resist layer having an antenna pattern is printed on a metal foil that is stacked on a label substrate, and materials other than the material of the antenna pattern are dissolved and removed by chemical etching. However, chemical etching cannot be used for a label substrate using a thermal paper.

For these reasons, application of RFID labels in which an inlay is omitted is currently limited only for labels for thermal transfer printing or ink jetting, indication seals having pre-printed surfaces, and so on.

In view of this, one aspect of the present invention is to provide an RFID label and an RFID recording medium that can use a thermal paper as a substrate.

Solution to Problem

One aspect of the present invention provides an RFID label including a label substrate, an RFID antenna, an IC chip, and an adhesive layer that are stacked in this order. The label substrate is a thermal paper having a thermosensitive color developing layer on one surface. The RFID antenna is provided on the other surface of the label substrate. The IC chip is connected to the RFID antenna with an ultraviolet curable anisotropic conductive adhesive.

Another aspect of the present invention provides an RFID recording medium including a thermal paper, an RFID antenna, an IC chip, an adhesive layer, and a substrate that are stacked in this order. The RFID antenna is provided on a surface opposite to a surface having a thermosensitive color developing layer of the thermal paper. The IC chip is connected to the RFID antenna with an ultraviolet curable anisotropic conductive adhesive.

Yet another aspect of the present invention provides a method for manufacturing an RFID label in which a thermal paper having a thermosensitive color developing layer, an RFID antenna, an IC chip, and an adhesive layer are stacked in this order. The method includes a step of forming the RFID antenna on a surface opposite to a surface having the thermosensitive color developing layer of the thermal paper, a step of placing an ultraviolet curable anisotropic conductive adhesive at a predetermined position of the RFID antenna that is formed on the thermal paper, and a step of placing the IC chip on the ultraviolet curable anisotropic conductive adhesive that is placed on the predetermined position of the RFID antenna. The method also includes a step of emitting ultraviolet light to cure the ultraviolet curable anisotropic conductive adhesive on which the IC chip is placed, thereby causing the RFID antenna and the IC chip to stick and electrically connect together, and a step of forming the adhesive layer on the surface on which the RFID antenna of the thermal paper is formed.

Advantageous Effects

The aspects of the present invention enable using a thermal paper as a substrate in an RFID label and an RFID recording medium.

DETAILED DESCRIPTION

(1) RFID Label

Figure 1:
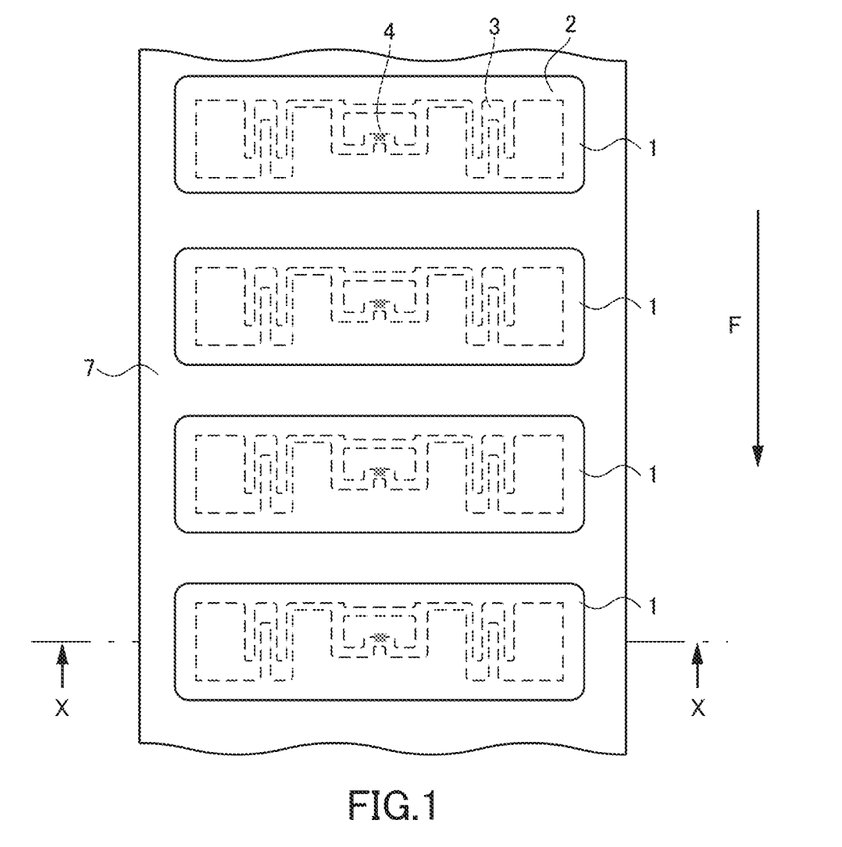
FIG. 1 is a plane view of a plurality of RFID labels temporarily attached to a separator.
Figure 2:
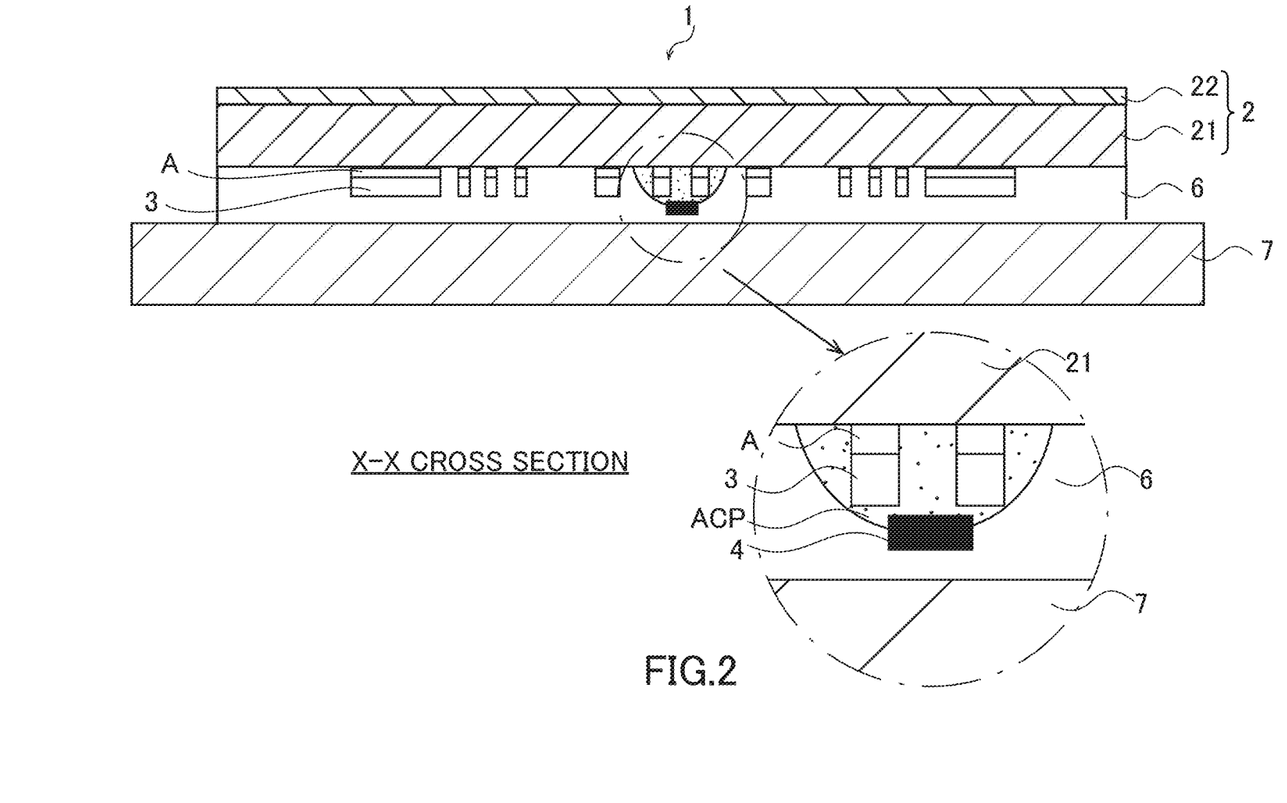
FIG. 2 is an enlarged view of an X-X cross section in FIG. 1.

The following describes an RFID label 1 of one embodiment with reference to FIGS. 1 and 2.

FIG. 1 is a plane view of a plurality of RFID labels 1 temporarily attached to a separator 7 with an adhesive. FIG. 2 is an enlarged view of an X-X cross section in FIG. 1. The arrow "F" illustrated in FIG. 1 coincides with a conveyance direction in a manufacturing apparatus 100, which will be described later.

As shown in FIG. 2, the RFID label 1 of the one embodiment is a label in which a thermal paper 2 serving as a label substrate, an antenna 3, an IC chip 4, and an adhesive-for-adherend 6 are stacked in this order.

The thermal paper 2 includes a substrate 21 and a thermosensitive color developing layer 22 that is provided on one surface of the substrate 21.

In this disclosure, a substrate of any material that is provided with a thermosensitive color developing layer on its surface can be applied for the "thermal paper", and the substrate is not limited to those having a paper-based substrate. For example, a film can also be used as a substrate of the thermal paper 2.

Examples of the material that can be used as the substrate 21 of the thermal paper 2 shown in FIG. 2 include papers such as fine papers and coated papers, single films of resin such as polyvinyl chloride, polyethylene terephthalate, polypropylene, polyethylene, and polyethylene naphthalate, and multilayer films formed by stacking a plurality of one or more types of these resin films.

An undercoat layer (adhesion-facilitating layer or barrier layer) may be provided between the thermosensitive color developing layer 22 and the substrate 21. The surface of the thermosensitive color developing layer 22 may be provided with an overcoat layer (protective layer, lubrication layer, or ultraviolet light resistant layer).

The thickness of the thermal paper 2, which is the same as the thickness of a continuous body "C" described later, is preferably 25 μm or greater and 300 μm or less. In the case of using a paper as the substrate 21, the thickness can be set to 50 μm or greater and 260 μm or less, within the above-described range. In addition, in the case of using a resin film as the substrate 21, the thickness can be set to 16 μm or greater and 200 μm or less, within the above-described range. The thickness of the thermal paper 2 can be selected as appropriate depending on the purpose.

The antenna 3 is made of a conductive material having a predetermined shape, as shown in FIG. 1. The shape of the antenna 3 is not limited to the antenna pattern illustrated in FIG. 1 and can be set as appropriate depending on the purpose of use of the RFID label 1. For example, the shape is designed to have a pattern corresponding to a certain frequency band, such as the UHF band (300 MHz to 3 GHz, and in particular, 860 MHz to 960 MHz), a microwave frequency band (1 to 30 GHz, and in particular, around 2.4 GHz), or the HF band (3 MHz to 30 MHz, and in particular, around 13.56 MHz).

The conductive material for forming the antenna 3 may be a metal foil, but not limited thereto, and any conductive material can be used.

In the case of using a metal foil as the antenna 3, the material of the metal foil is, for example, copper or aluminum. In view of reducing production cost, aluminum is preferably used. Moreover, from the point of view of the total thickness and production cost of the RFID label 1, the thickness of the antenna 3, which is the same as the thickness of a continuous body "M" of a metal sheet described later, is preferably 3 μm or greater and 25 μm or less.

Examples of an adhesive "A" include acrylic adhesives, urethane adhesives, silicone adhesives, and rubber adhesives. Among them, ultraviolet curable acrylic adhesives are preferably used.

The adhesive strength of the adhesive "A" is preferably 500 gf/25 mm or greater, more preferably 800 gf/25 mm or greater, and further preferably 1000 gf/25 mm or greater, in a 180-degree peel test (JIS Z 0237). The upper limit of the adhesive strength is preferably 2000 gf/25 mm.

As shown by a further enlarged view of a part in the vicinity of the IC chip 4 in FIG. 2, anisotropic conductive paste of ultraviolet curable anisotropic conductive adhesive, which is abbreviated as "ACP" in the drawings and in the descriptions hereinafter, is placed at a center part of the antenna 3. The IC chip 4 is placed on the ACP.

An ultraviolet curable anisotropic conductive adhesive is an adhesive that cures upon being irradiated with ultraviolet light (UV), and it contains uniformly dispersed conductive particles. The ultraviolet curable anisotropic conductive adhesive joins the IC chip 4 to a predetermined position of the antenna 3 while providing conductivity between the IC chip 4 and the antenna 3.

The dimensions of the conductive particles contained in the ACP can be determined as appropriate in accordance with, for example, surface roughness of the antenna 3. The dimensions of the conductive particles are preferably 10 μm or greater and 30 μm or less, in order to ensure stable electrical connection.

As shown in FIG. 2, the substrate 21 of the thermal paper 2 is provided with the adhesive-for-adherend 6, on the entire surface on a side opposite to the surface provided with the thermosensitive color developing layer 22. The adhesive-for-adherend 6 is used to attach the RFID label 1 to the separator 7. In order to increase adhesion of the adhesive-for-adherend 6, an undercoat layer may be disposed on the surface to be provided with the adhesive-for-adherend 6, of the substrate 21 of the thermal paper 2. A barrier layer for preventing permeation of the adhesive-for-adherend 6 may also be provided.

Examples of an adhesive that can be used as the adhesive-for-adherend 6 include emulsion adhesives (adhesives dispersed in water), solvent adhesives (adhesives dissolved in solvent), and hot-melt adhesives (thermoplastic adhesives). The material of this adhesive may be a synthetic rubber material, a natural rubber material, an acrylic resin material, a polyvinyl ether resin material, a urethane resin material, a silicone resin material, or the like. The adhesive strength of this adhesive can be set as appropriate depending on the application of the RFID label 1.

The separator 7 can be, for example, a paper or film that is coated with ultraviolet curable silicone, thermosetting silicone, solvent silicone, alkyl pendant polymer, or fluorine release agent.

(2) Method for Manufacturing RFID Label

Figure 3:
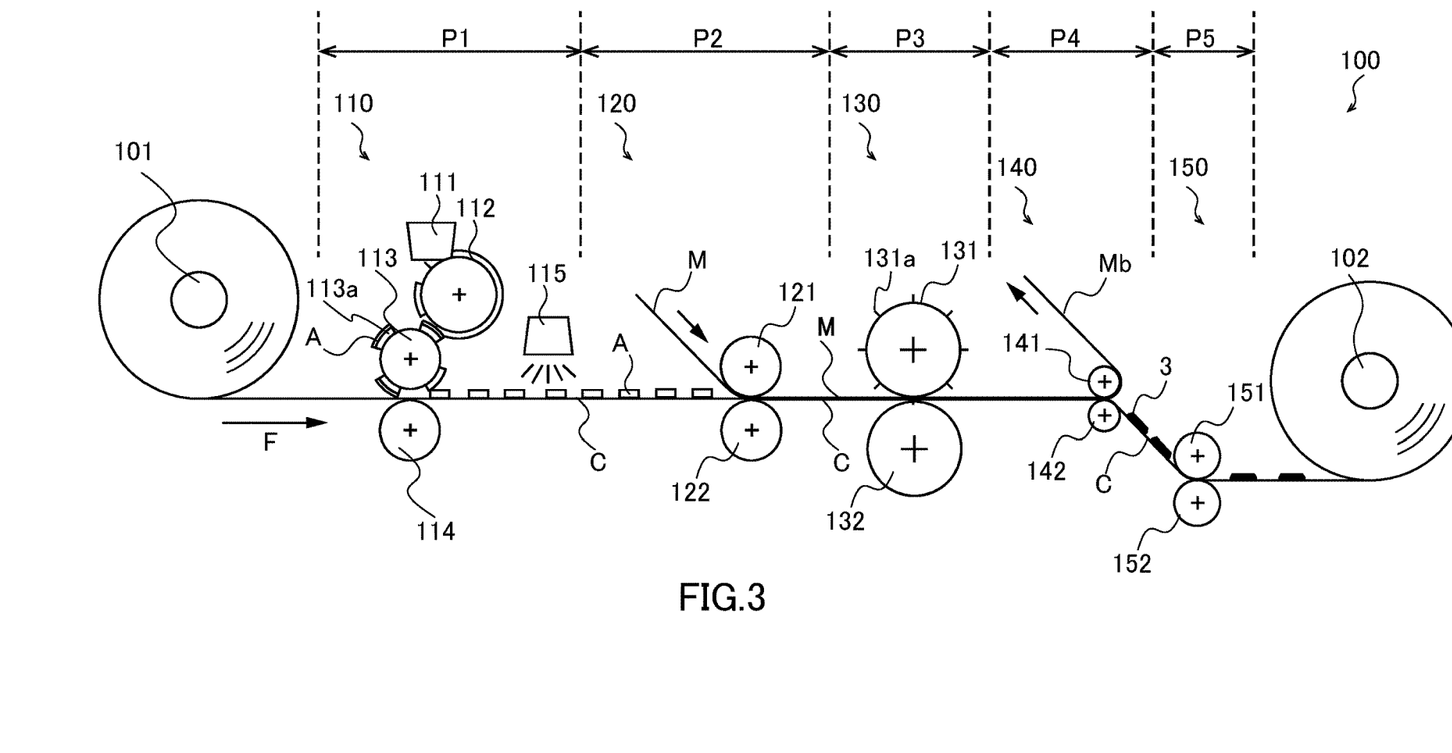
FIG. 3 is a schematic diagram of a manufacturing apparatus that executes a method for manufacturing an antenna pattern according to an embodiment.

Next, a method for manufacturing the RFID label 1 of the one embodiment will be described with reference to FIG. 3. FIG. 3 is a schematic diagram of a manufacturing apparatus 100 that executes some steps in the method for manufacturing the RFID label 1 of the one embodiment. The manufacturing apparatus 100 is used to execute a process of forming antennas 3 on a thermal paper 2 (hereinafter referred to as an "antenna forming process") in manufacturing the RFID label 1.

As shown in FIG. 3, the antenna forming process includes an adhesive placement process P1, a metal sheet placement process P2, a cut-forming process P3, a removal process P4, and a pressurizing process P5 that are executed while a continuous body "C" of a thermal paper 2 is conveyed. The adhesive placement process P1 is performed to place an adhesive "A" on the continuous body "C" of the thermal paper 2. The metal sheet placement process P2 is performed to place a continuous body "M" of a metal sheet on a surface disposed with the adhesive "A" of the continuous body "C." The cut-forming process P3 is performed to form cuts for antennas 3, in the continuous body "M" of the metal sheet. The removal process P4 is performed to remove unnecessary parts Mb that do not constitute the antennas 3, from the continuous body "M" of the metal sheet. The pressurizing process P5 is performed to pressurize the antennas 3 remaining on the continuous body "C." The arrow "F" in FIG. 3 shows the conveyance direction.

The adhesive placement process P1 is executed by an adhesive placement unit 110. The adhesive placement unit 110 includes an adhesive tank 111 for storing the adhesive, a drawing-up roller 112 for drawing up the adhesive from the adhesive tank 111, a printing plate roller 113 for receiving the adhesive "A" from the drawing-up roller 112 and printing the continuous body "C," and an impression cylinder 114. In addition, the adhesive placement unit 110 also includes a UV lamp 115 for emitting ultraviolet light to the adhesive "A."

The printing plate roller 113 has a plate cylinder that is wound with printing plates, which are formed with protrusion patterns 113a corresponding to the shape of the adhesive "A" to be placed on the continuous body "C" of the thermal paper 2. The printing plate roller 113 is formed with the plurality of protrusion patterns 113a. The plurality of protrusion patterns 113a are imposed to be arranged in a feed direction and a width direction of the printing plate roller 113. Thus, a plurality of adhesives for antenna patterns are printed on the continuous body "C" at the same time. Each protrusion pattern 113a has a shape so as to be inside an outer circumferential line of the antenna 3 that is placed on the continuous body "C" of the thermal paper 2.

Examples of the adhesive "A" that can be used in the adhesive placement process P1 include acrylic adhesives, urethane adhesives, silicone adhesives, and rubber adhesives, as described above. In this antenna forming process, ultraviolet curable acrylic adhesives are preferably used from the point of view of performing flexography or relief printing to place the adhesive "A" on the continuous body "C" that is being conveyed. Alternatively, it is also possible to employ screen printing.

The thickness of the adhesive "A" that is placed on the continuous body "C" is preferably 3 μm or greater and 25 μm or less. The adhesive "A" having a thickness of 3 μm or greater has an adhesive strength sufficient to adhere to the antenna 3, and the adhesive "A" having a thickness of 25 μm or less is not pressed out of the outer circumferential line of the antenna 3 by pressurizing. In view of this, the thickness of the adhesive "A" is more preferably 3 μm or greater and 10 μm or less.

Figure 4:
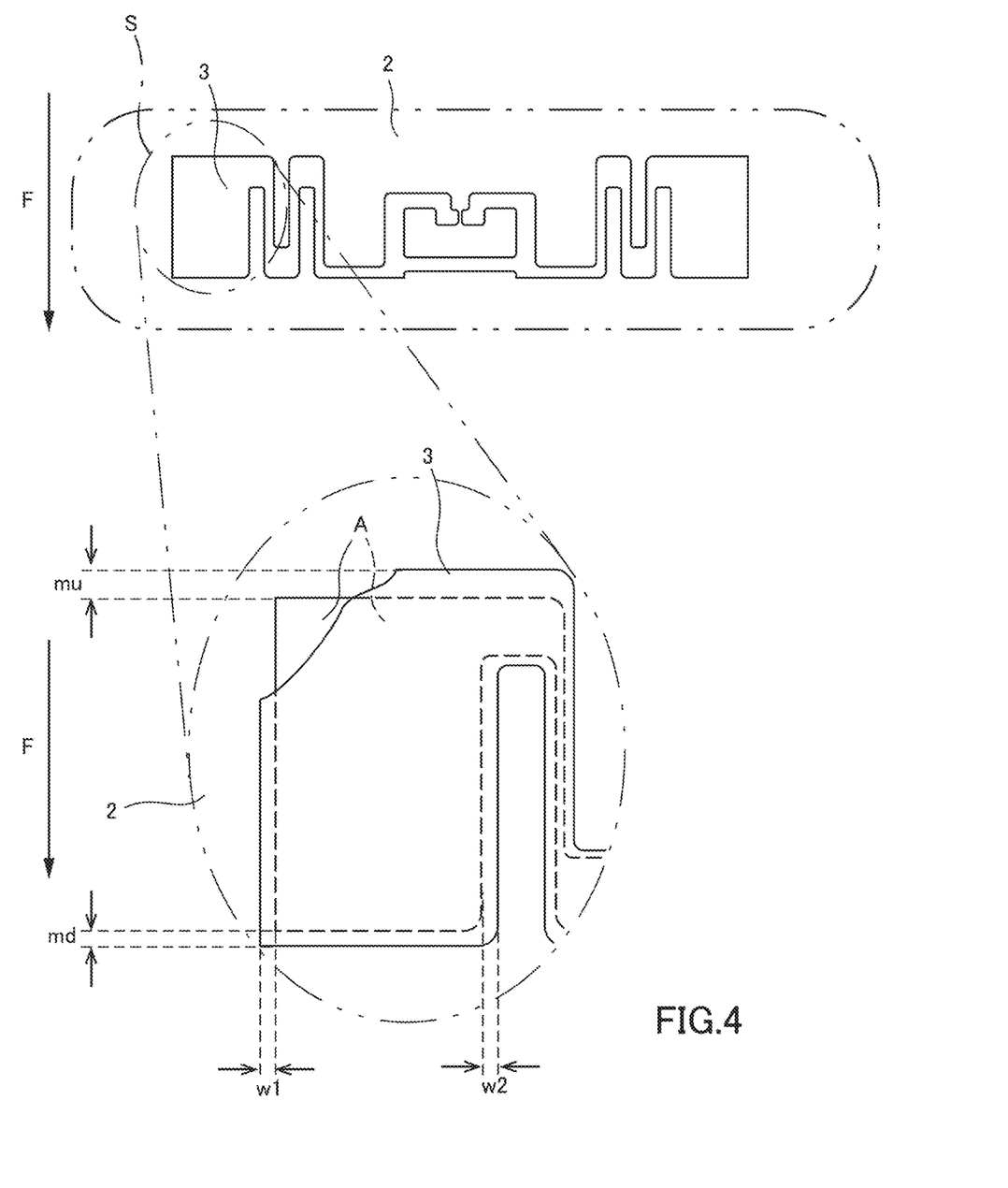
FIG. 4 is a partially enlarged view of a partially cut main part of an in-process RFID label according to the embodiment.

FIG. 4 is a partially enlarged view of a partially cut main part "S" on a back side of an in-process RFID label 1 in the antenna forming process. In the enlarged part of the in-process RFID label 1 shown in FIG. 4, a part underlying the antenna 3 of the adhesive "A" is represented by dashed lines. In addition, margins between the outer circumferential line of the antenna 3 and the adhesive "A" placed inside thereof are denoted by "mu," "md," "w1," and "w2," in FIG. 4.

The placement position of the adhesive "A" is determined so that the margin "mu" on an upstream side in the conveyance direction will be wider than the margin "md" on a downstream side in the conveyance direction. That is, the margin "mu" shown in FIG. 4 is greater than the margin "md."

Excessively large margins can cause the antenna 3 to rise at an edge or come off. On the other hand, excessively small margins can cause the adhesive "A" to spread beyond an outer circumference of the antenna 3. In view of this, the margin "mu" is preferably 50 μm or greater and 300 μm or less, whereas the margin "md" is preferably 30 μm or greater and 100 μm or less, in the condition in which a relationship "mu>md" is satisfied.

In an embodiment, a process of printing reference marks may be executed prior to the adhesive placement process P1. The reference marks can be used as references for positioning the adhesives in printing the continuous body "C" and as references for determining cut positions in making cuts for the antenna patterns.

The metal sheet placement process P2 is executed by a metal sheet placement unit 120. The metal sheet placement unit 120 includes a pressing roller 121 and a support roller 122. In the metal sheet placement process P2, the continuous body "M" of the metal sheet is conveyed in a conveyance path different from the conveyance path of the continuous body "C" and is overlaid on the surface on which the adhesive "A" has been placed of the continuous body "C." Then, the continuous bodies "C" and "M" are inserted between the pressing roller 121 and the support roller 122 to be bonded together. The adhesive is not present at a part outside the outer circumferential line of the antenna 3, and therefore, the continuous body "M" of the metal sheet does not adhere to the continuous body "C" except for areas in which the antennas 3 are to be formed.

The cut-forming process P3 is executed by a cut-forming unit 130. The cut-forming unit 130 includes a die roll 131 for making cuts for the antennas 3, in the continuous body "M" of the metal sheet placed on the continuous body "C," and it also includes an anvil roller 132 for supporting the die roll 131 from below. The die roll 131 has a surface formed with projecting blades 131a that have a shape corresponding to the outer circumferential line of the antenna 3. The projecting blade 131a can be a flexible die. Alternatively, it is also possible to use an engraving blade, an implanted blade, or the like, for the projecting blade 131a.

The cut-forming unit 130 causes the projecting blades 131a to cut into the continuous body "M" of the metal sheet to define the antennas 3, while nipping and continuously conveying a work having the continuous bodies "C" and "M." This forms cuts in the continuous body "M" of the metal sheet.

The removal process P4 is executed by a removal unit 140. The removal unit 140 includes peeling rollers 141 and 142. The unnecessary parts Mb of the metal sheet are fitted along a part of the peeling roller 141 and are changed in the conveyance direction, while the work is fitted along a part of the peeling roller 142 and is conveyed in a direction different from the conveyance direction of the unnecessary parts Mb. Thus, the unnecessary parts Mb of the metal sheet are separated from the work having the continuous bodies "C" and "M." The unnecessary parts Mb that are collected are subjected to a reprocessing process and are reused as the continuous body "M" of the metal sheet.

The pressurizing process P5 is executed by a pressurizing unit 150. The pressurizing unit 150 includes a pressing roller 151 and a support roller 152. The pressurizing unit 150 pressurizes the work while nipping and conveying it between the pressing roller 151 and the support roller 152, to spread the adhesive "A" over the entire surfaces of the antennas 3 placed on the continuous body "C." The degree of pressure is preferably 2 kg/cm or greater and 6 kg/cm or less.

After the pressurizing process P5 is performed, the work having the antennas 3 placed on the continuous body "C" is wound up by a winding roller 102.

The antenna forming process including the processes P1 to P5 described above enables forming the antennas 3 on the continuous body "C" of the thermal paper 2.

In the pressurizing process P5 of the antenna forming process, the pressurizing unit 150 pressurizes the work while nipping it between the pressing roller 151 and the support roller 152, to spread the adhesive "A" over the entire surfaces of the antennas 3 placed on the continuous body "C." In addition, pressurizing causes adhesion of the adhesive "A," whereby the antenna 3 is closely attached to the continuous body "C."

In the pressurizing process P5, when the work, which has the antennas 3 placed on the continuous body "C," is pressurized by the pressing roller 151 and the support roller 152 while being conveyed, the adhesive "A" that is placed between the continuous body "C" and the antenna 3 is drawn to the upstream side in the conveyance direction. In consideration of this, in the method for manufacturing the antenna pattern of this embodiment, the placement position of adhesive "A" is arranged so that the margin on the upstream side in the conveyance direction will be wider than the margin on the downstream side in the conveyance direction between the outer circumferential line of the antenna 3 and the adhesive "A" placed inside thereof. As a result, the adhesive "A" that is drawn to the upstream side in the conveyance direction remains within the margin "mu," which is set wide on the upstream side in the conveyance direction.

In the antenna forming process, the adhesive "A" does not adhere to the unnecessary parts Mb of the metal sheet, and therefore, a winding roller for the unnecessary parts Mb (not shown in FIG. 3) does not need to be applied with a peeling force for peeling the unnecessary parts Mb from the work, in winding up the unnecessary parts Mb. This enables setting a conveying speed of the work without having to consider factors such as the peeling force of the unnecessary parts Mb of the metal sheet and breakage due to the peeling force. In addition, the unnecessary parts Mb of the metal sheet, which do not have the adhesive "A" and other foreign substances due to adhesion of the adhesive "A," has good handleability after being collected and also provides excellent reusability of the metal sheet.

In the removal process P4 of the antenna forming process, in addition to the peeling rollers 141 and 142 that separate the work and the unnecessary parts Mb of the metal sheet from each other, a suction mechanism for sucking to remove the unnecessary parts Mb may also be provided. This configuration reliably removes metal sheet pieces that tend to be left on the work only by separation using the peeling rollers 141 and 142.

Although not illustrated, after the antenna forming process, an adhesion-facilitating process, an ACP ejecting process, an IC chip placement process, and an ACP curing process are performed in this order.

The adhesion-facilitating process is a process for emitting laser to an IC chip placement surface of the antenna to roughen the surface.

In the ACP ejecting process, ACP is ejected from a dispenser to a predetermined position of each antenna 3, which is formed on the continuous body "C" of the thermal paper in the antenna forming process.

In the IC chip placement process, the IC chip 4 is placed by pressing it against the ACP, which is disposed on the antenna 3 in the ACP ejecting process.

In the ACP curing process, the ACP on the antenna 3 is irradiated with ultraviolet light to be cured while the IC chip 4 placed on the antenna 3 is pressed by a pressing unit. An ultraviolet light irradiator may be integrated with the pressing unit or may be disposed on an oblique upper side so as to emit ultraviolet light to the ACP from an oblique upward direction. An LED lamp that generates less heat is suitable for the ultraviolet light irradiator.

The ACP ejecting process, the IC chip placement process, and the ACP curing process cause the antenna 3 and the IC chip 4 to stick and electrically connect together.

Next, the substrate 21 on which the antenna 3 and the IC chip 4 have been stacked, is applied with the adhesive-for-adherend 6, on the entire surface, and it is then temporarily attached to the separator 7. Thus, the RFID label 1 in the state shown in FIG. 1 is completed. Alternatively, the separator 7 may be applied with an adhesive on a release layer side surface and may be bonded to the substrate 21, including the antenna 3 and the IC chip 4. Thereafter, the completed RFID label 1 is punched into a desired shape.

The RFID label 1, which is manufactured as described above, has the antenna 3 and the IC chip 4 that are directly placed on the surface opposite to the surface provided with the thermosensitive color developing layer 22, of the thermal paper 2. This structure enables to omit a base film of an inlay, resulting in reduction in the amount of constituent materials and contribution to resource saving. In this RFID label 1, the antenna 3 and the IC chip 4 are bonded together by emitting ultraviolet light to the ACP. That is, unlike a conventional bonding method using a thermosetting adhesive, heat is not applied in bonding the antenna 3 and the IC chip 4 together, whereby the thermal paper 2 in the vicinity of the IC chip 4 is not discolored. Thus, the RFID label 1 can be used in a wide application in printing the thermal paper 2 by a thermal printer.

Figure 5:
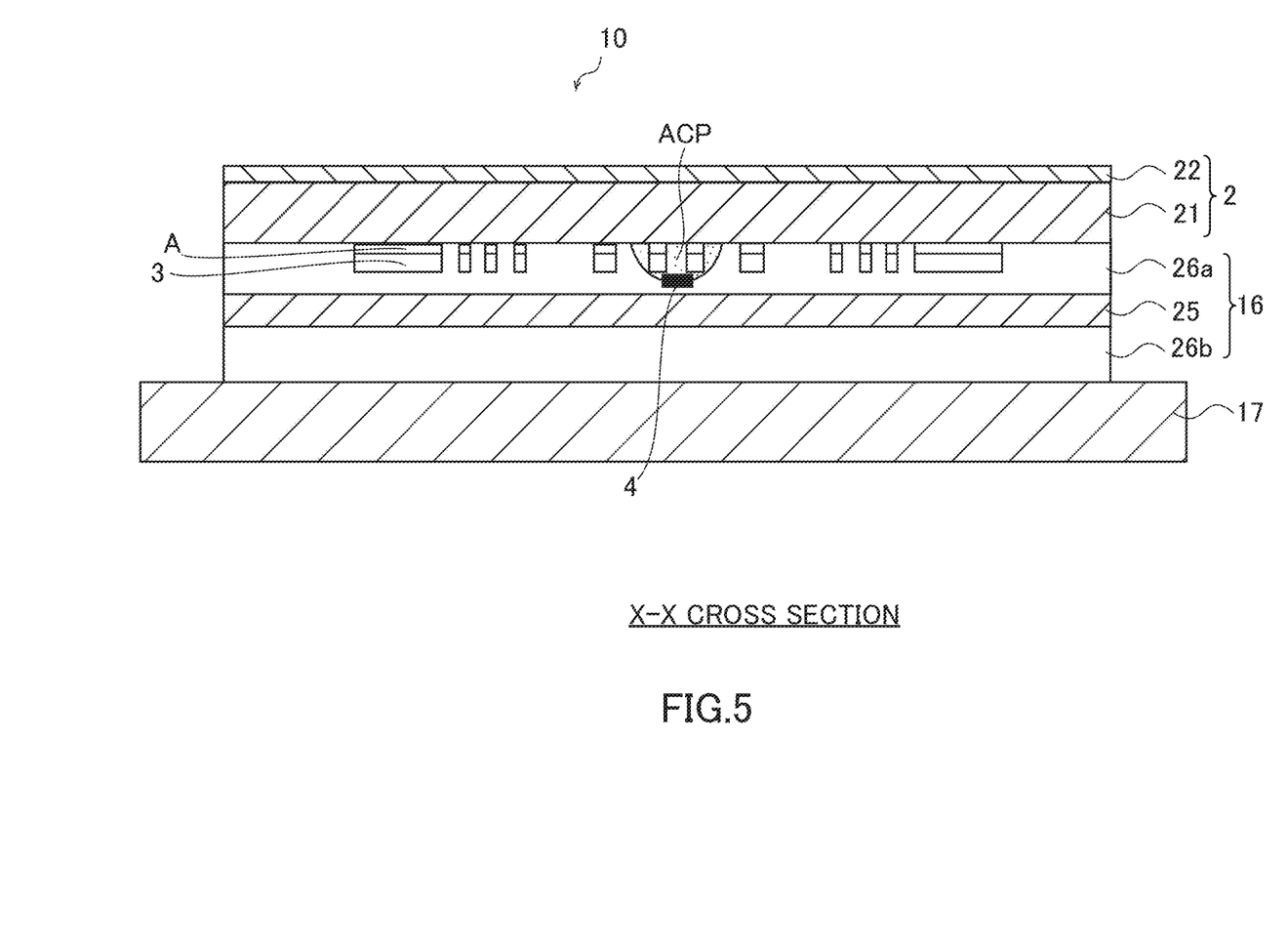
FIG. 5 is a sectional view of an RFID label of another embodiment.

FIG. 5 shows an RFID label 10 of another embodiment. FIG. 5 illustrates a cross section of the RFID label 10 in the same manner as in FIG. 2.

The RFID label 10 uses a double-sided adhesive tape 16 instead of the adhesive-for-adherend 6 of the RFID label 1, which is already described with reference to FIG. 2. The double-sided adhesive tape 16 is composed of an adhesive layer 26a, a core material 25 made of paper or film, and an adhesive layer 26b that are stacked in this order. A tape roll (not shown) of the double-sided adhesive tape 16 has a separator that is temporarily attached to each of the adhesive layers 26a and 26b. The separator on the adhesive layer 26a is peeled from the tape roll, and the exposed adhesive layer 26a is laminated on a surface on the antenna 3 side of the thermal paper 2, whereby the cross sectional structure shown in FIG. 5 is obtained. In this case, the separator of the double-sided adhesive tape may be used as a separator 17, as it is, or it may be exchanged for another separator suitable for a label.

In addition, it is also possible to use a tape roll of a double-sided adhesive tape 16 that is wound by using a double-sided release coated separator that has a release agent layer on each side of a substrate. A lamination body of the double-sided adhesive tape 16 and the double-sided release coated separator may be laminated on a surface on the antenna side of the thermal paper 2.

The cross sectional structure in FIG. 5 imparts cushioning characteristics due to the core material 25, which is effective to protect the IC chip 4.

The double-sided adhesive tape may be one that does not have a core material. In this case, the cross sectional structure as shown in FIG. 2 is obtained. The separator of the double-sided adhesive tape may be used as the separator 17, as it is, or it may be exchanged for a separator suitable for a label roll in laminating.

(3) RFID Recording Medium

An RFID recording medium of one embodiment includes an outside base material that is placed on the adhesive-for-adherend 6 of the RFID label 1, instead of the separator 7.

The RFID recording medium can be used as, for example, a tag, a card, a wrist band, or a ticket, and the outer shapes of the thermal paper 2 and the outside base material are determined depending on the application of the RFID recording medium.

A method for manufacturing the RFID recording medium can be the same as the above-described method for manufacturing the RFID label, except that the outside base material is attached to the adhesive-for-adherend 6, instead of the separator 7.

Although embodiments of the RFID label, the RFID recording medium, and the method for manufacturing the RFID label are described above, the present invention should not be limited to the foregoing embodiments. In addition, the embodiments described above can be variously modified and altered within the scope not departing from the gist of the present invention.

The present invention is related to Japanese Patent Application No. 2021-13411 filed with the Japan Patent Office on Jan. 29, 2021, the entire contents of which are incorporated into this specification by reference.

The invention claimed is:

1. An RFID label comprising:
a label substrate, an RFID antenna, an IC chip, and an adhesive layer that are stacked in this order, wherein:
the label substrate is a thermal paper having a first surface and a second surface opposite to the first surface,
a thermosensitive color developing layer is formed on the first surface,
the RFID antenna is provided on the second surface, and
the IC chip is connected to the RFID antenna with an ultraviolet curable anisotropic conductive adhesive.

2. The RFID label according to claim 1, wherein the RFID antenna is made of a conductive material.

3. The RFID label according to claim 2, wherein the conductive material is a metal foil.

4. The RFID label according to claim 1, wherein the adhesive layer is a double-sided adhesive tape in which an adhesive layer, a sheet core material, and an adhesive layer are laminated in this order.

5. An RFID recording medium comprising:
a thermal paper, an RFID antenna, an IC chip, an adhesive layer, and a substrate that are stacked in this order, wherein:
thermal paper has a first surface and a second surface opposite to the first surface;
a thermosensitive color developing layer is formed on the first surface;
the RFID antenna is being provided on the second surface, and
the IC chip is connected to the RFID antenna with an ultraviolet curable anisotropic conductive adhesive.

6. A method for manufacturing an RFID label in which a thermal paper having a thermosensitive color developing layer on a first surface, an RFID antenna, an IC chip, and an adhesive layer are stacked in this order, the method comprising:
a step of forming the RFID antenna on a second surface opposite to the first surface of the thermal paper;
a step of placing an ultraviolet curable anisotropic conductive adhesive at a predetermined position of the RFID antenna that is formed on the thermal paper;
a step of placing the IC chip on the ultraviolet curable anisotropic conductive adhesive that is placed on the predetermined position of the RFID antenna;
a step of emitting ultraviolet light to cure the ultraviolet curable anisotropic conductive adhesive on which the IC chip is placed, thereby causing the RFID antenna and the IC chip to stick and electrically connect together; and
a step of forming the adhesive layer on the surface on which the RFID antenna of the thermal paper is formed.

* * * * *